United States Patent Office 3,441,930
Patented Apr. 29, 1969

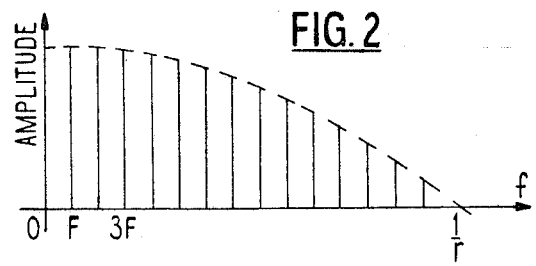
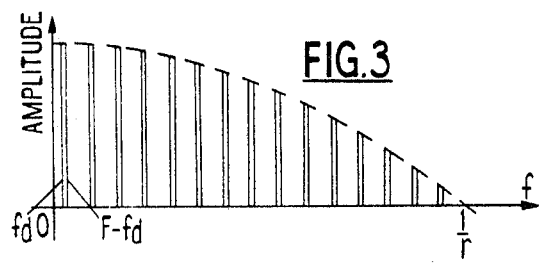
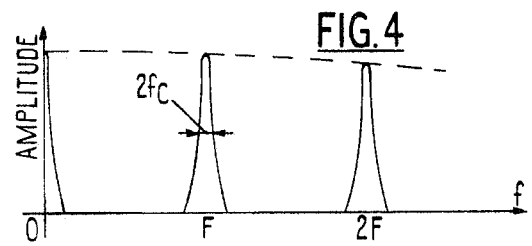
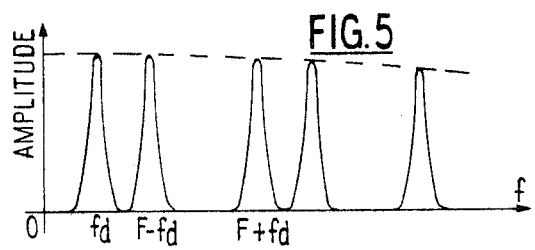

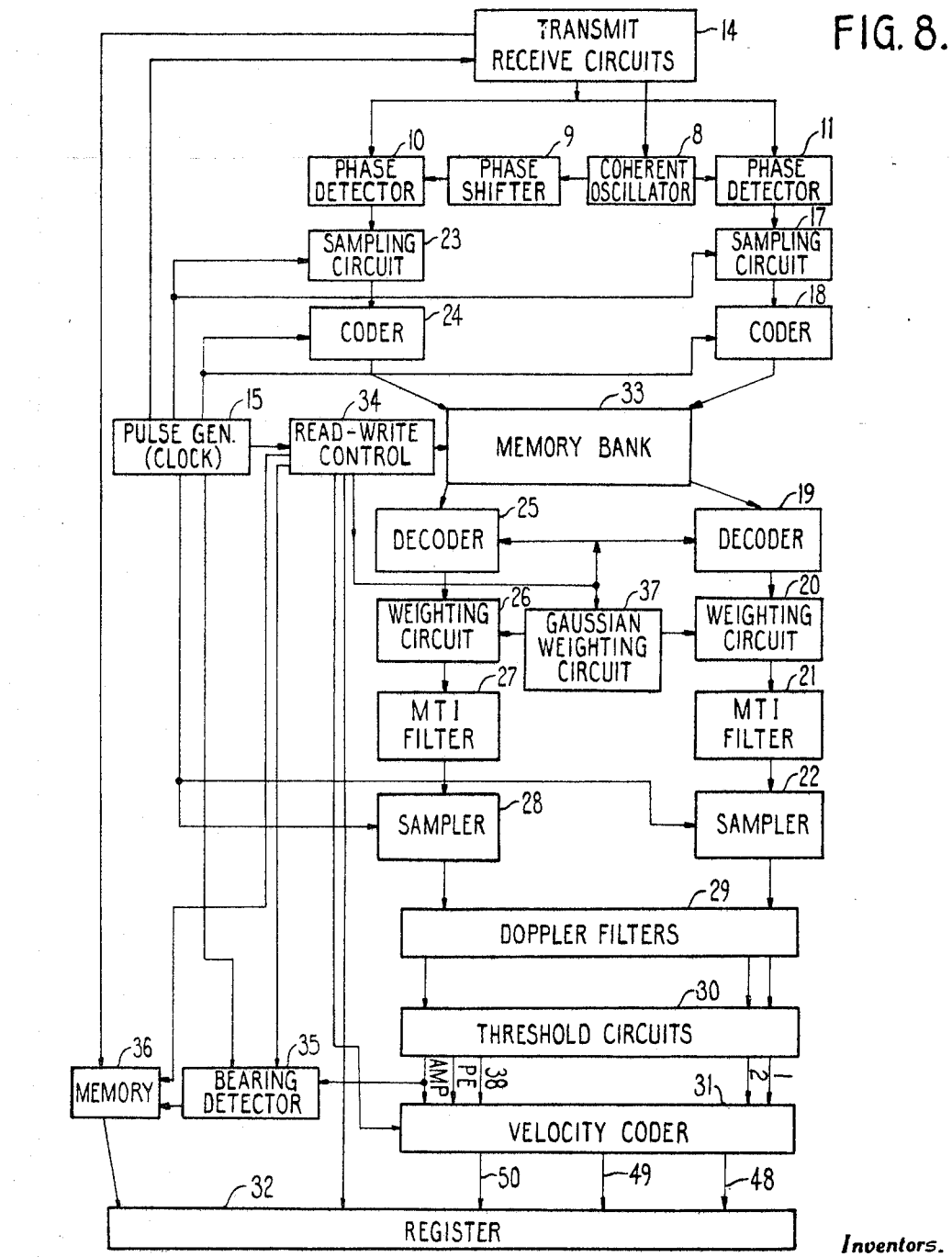

3,441,930
DOPPLER RADARS
Gérard Marie Edouard van den Broek d'Obrenan, Versailles, and Jean-François Marie Maurice Edmond Mercier, Sceaux, France, assignors to International Standard Electric Corporation, New York, N.Y., a corporation of Delaware
Filed Sept. 20, 1967, Ser. No. 669,107
Claims priority, application France, Sept. 21, 1966, 77,058
Int. Cl. G01s 9/42
U.S. Cl. 343—7.7                                6 Claims

ABSTRACT OF THE DISCLOSURE

A coherent pulse-Doppler radar system is described, including pulsed transmitting, receiving and duplexing means, a coherent oscillator, and phase comparison means for comparing the phase of received energy with that of the related transmitted signals. The repetition frequency of the transmitted pulses is randomly varied preferably in accordance with a Gaussian function.

The video data processing is carried out in conjunction with digital techniques, the signals being stored in digital form and evaluated historically by fixed range increment, from which Doppler velocities with sense are extracted. An output storage (register) holds range, bearing, velocity and sense information for a large number of targets in digital form.

Structure is included for randomizing the pulse repetition rate to eliminate "second-time around" echoes and "blind speeds."

BACKGROUND OF THE INVENTION

Field of the invention

This invention relates to radar systems and more particularly to MTI (Moving Target Indicator) systems.

The present invention most particularly concerns improvements to coherent pulse-Doppler radars and means associated with such radars making possible on the one hand, the elimination from the received signal video, any signals due to fixed reflecting objects, and on the other hand to extract, from the received signals the information of position and radial velocity concerning the moving reflecting objects which are within the maximum range of the radar.

Description of the prior art

Electromagnetic systems for detection of moving objects among fixed objects by taking advantage of the Doppler effect are known. In particular, in electromagnetic detection systems which operate by pulses, advantage is taken of the variations of the phase shift between he transmitted wave and the received wave from one repetition period to the following one when the received wave is reflected by a moving object. To this effect, at each repetition period, the phase of the transmitted wave is kept in memory and compared with that of the received wave. This phase shift is constant from one repetition period to the following one for the waves received after reflection from fixed objects, whereas it varies linearly with time in the case of waves received after reflection from an object moving at a constant radial velocity with respect to the antenna. If one applies to a phase detector, on the one hand the reference signal which, at each repetition period, keeps the memory of the phase of the transmitted wave, and on the other hand the signal received after reflection from a fixed or moving object, one obtains, for signals received after reflection from fixed objects, pulses of constant amplitude and for signals received after reflection from moving objects, pulses, the amplitude of which varies sinusoidally at a frequency $f_d$ generally called Doppler frequency. This phenomenon is linked to the radial velocity $v$ and to the transmitted wavelength $\lambda$ of the system by the formula: $f_d = 2v/\lambda$.

The frequency spectrum of pulses of constant amplitude corresponding to fixed objects is constituted by discrete lines at the frequencies F. 2F ... $nF$ (F being the repetition frequency of the transmitted pulses) whereas the frequency spectrum of the pulses corresponding to moving objects is constituted by discrete lines of the type $nF \pm f_d$. In order to eliminate the signals corresponding to fixed objects, the output signals of the phase detector may be applied to a filter, the bandwidth of which ranges between O and F/2. In that case, the signals corresponding to fixed objects are then eliminated and only the signals corresponding to moving obstacles pass through the filter. In actual fact, the frequency spectra of the signals obtained at the output of the phase detector circuit are much more intricate. They comprise, in particular, lines $nF \pm fc$ which are due to the instability of the circuits (oscillator, modulator), to the rotation of the antenna, to the movements of the fixed obstacles such as the trees stirred by the wind, etc. It is for these causes that developments in this art have included provision for a bandpass filter called an MTI filter, the lower cut-off frequency of which is $fc$. It is then possible to eliminate practically the signals corresponding to fixed objects. With such a system, the signals corresponding to moving objects, the radial velocities of which correspond to Doppler frequencies $f_d$ such as $nF - fc < f_d < nF + fc$, are also eliminated. These radial velocities which are usually called "blind speeds" correspond to moving objects which, in certain cases, may constitute a non-negligible part of the moving objects the velocity of which is desired to be known.

The output signals of the bandpass filter correspond thus to moving objects, one of the spectrum lines of which, and only one, $nF \pm f_d$ is in the bandwidth of the filter. This means that the rank $n$ of the said line is not known and, therefore, that this Doppler frequency $f_d$ cannot be determined. This determination is called ambiguity in the measurement of the Doppler frequency.

On the other hand, an ambiguity exists also in the measurement of the range which is due to the fact that the signal received at an instant $t_1$ of a repetition period of duration T may come from objects located at a distance $d_1, d_1+D \ldots d_1+aD$, the said objects having reflected energy from the last pulse transmitted ($d_1$), or the preceding one ($d_1+D$) or even one of the preceding ones ($d_1+aD$) where $a$ is an integer and $D$ designates the maximum range of the radar such as $D=cT/2$. This range ambiguity is not serious in the case where the signals coming from objects beyond the maximum range $D$ of the radar are weak and beneath the detection threshold; however, this range ambiguity can exist, for instance, in the case where the output power of the transmitted pulse is large and where one is interested in the objects located at a relatively close range from the antenna. In this case, echoes known as "second-time around" echoes, i.e. from objects having reflected the penultimate transmitted pulse, may appear and are not distinguishable from echoes having reflected the last transmitted pulse. This particular problem is not unique to MTI systems but appears as a particularly vexatious problem in MTI because they escape the transmitted phase energy memory and therefore are not cancelled in the normal manner.

The unique solutions to these prior art problems afforded by the present invention will be apparent as the description proceeds.

SUMMARY OF THE INVENTION

The present invention is directed toward the solution of the problem of range and velocity ambiguities in MTI primarily through unique video data processing based on random pulse repetition frequency. Obviously, an echo appears at different apparent ranges when it is illuminated by randomized transmitted pulses. The present invention exploits the fact that "second-time-around" echoes do not fall in the same places on the display of a random PRF system and therefore can be effectively eliminated by an integration technique.

In respect to velocity ambiguities, it will be noted that in a random PRF system an object at "blind speed" does not reflect the same static phase of energy comparison as would be the case with a fixed PRF MTI system.

The more specific details of operation follow under detailed description, the cooperation of the circuits being very important in the actual instrumentation of the invention.

Fundamentally, the object of the present invention was to devise an MTI radar system unaffected by the "blind speed" phenomenon and likewise immune to ambiguities of range or velocity.

According to the features of the present invention, the circuit functions associated with a coherent pulse-Doppler radar may be summarized as: structure to transmit a repetitive pattern of N pulses chosen in a series of pulses the repetition period of which varies around an average value, the said variations following the Gaussian law; a digital coder providing for coding the output signals of the two phase detector circuits of the coherent Doppler radar; digital recording, according to the successive lines of a memory, of the binary digits corresponding to the signals received in the course of successive repetition periods; digital read-out in the course of each repetition period, to read the binary words of a column of the memory, these readings being made in such a way that in the course of a repetition period the number of binary words which are read and not rewritten should be equal to the number of binary words which are written; a weighting device to which are applied the binary words read during a repetition period enabling the deviation of analog signals multiplied by coefficients varying according to a Gaussian curve; filtering to eliminate the components due to fixed objects; sampling and delaying of the filtered signals to locate the read signal with respect to the pulse of the pattern which has produced it, these sampled and delayed signals being then applied to a battery of Doppler filters followed by a threshold circuit which allows passage only to the maximum output signal of one of the Doppled filters if it is higher than a predetermined value; and finally, bearing identification to determine and present the bearing of the antenna at the time when this maximum signal has been received.

BRIEF DESCRIPTION OF THE DRAWINGS

For purposes of illustration and explanation, drawings are provided as follows:

FIGS. 2, 3, 4, 5, and 6 are frequency spectrum drawings relating to the operation of a coherent pulse-Doppler radar of constant repetition frequency.

FIG. 8 is a block diagram of a coherent pulse-Doppler radar according to the present invention.

DESCRIPTION OF THE PREFERRED EMBODIMENTS

Figure 1:
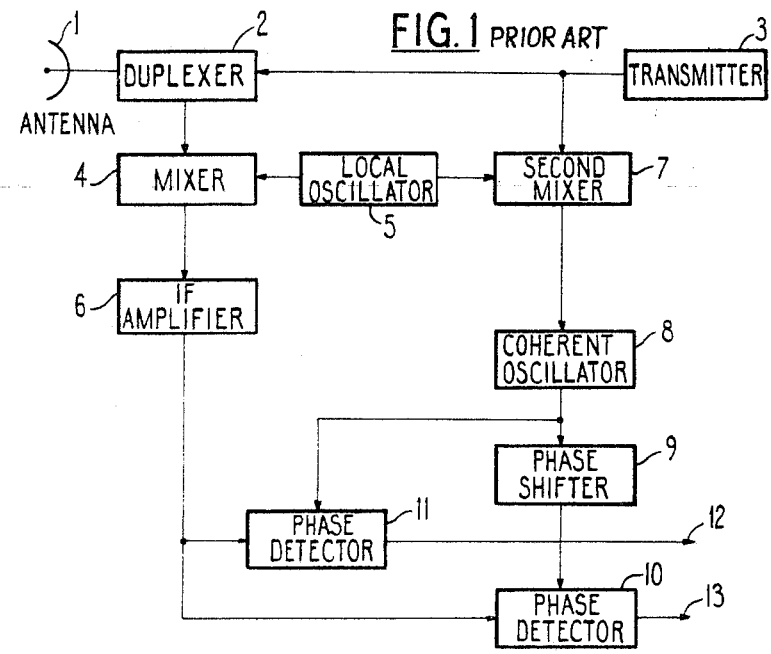
FIG. 1 is a simplified block diagram of a coherent pulse-Doppler radar system.

FIG. 1 represents a simplified diagram of a coherent pulse-Doppler radar of the classical type, such as described in chapter 4 of the textbook by Merrill I. Skolnik, entitled, "Introduction to Radar Systems," published by McGraw-Hill Book Company in 1962. It includes an antenna 1 used for transmission and reception, a transmitter 3 supplying high frequency pulses, the said pulses being transmitted to the common transmission and reception antenna 1 through a high frequency switch (duplexer) 2. The signals received as echoes in response to the transmitted pulses are switched by the duplexer 2 towards a mixer circuit 4 which also receives the output signal of a local oscillator 5. The output signals of the mixer 4 are applied to the intermediate frequency amplifier 6. The output signal of the local oscillator 5 is also applied to a second mixer circuit 7 which receives also, in the course of the duration of the transmitted radar pulse, a small fraction of the high frequency signal energy supplied by the transmitter 3. The intermediate frequency pulse which comes out of the mixer circuit 7 is, at the beginning of each repetition period of the radar, used for starting the coherent oscillator 8, the said oscillator supplying then an intermediate frequency signal which has a fixed predetermined phase relation with the phase of each corresponding pulse. At the beginning of each repetition period, this oscillator 8 is thus started in the manner described hereabove, then stopped before the beginning of the following repetition period. The coherent oscillator 8 may be said to remember the phase of the transmitted energy in each pulse, translated to the IF domain. The output signal of the coherent oscillator 8 is applied to two phase detector circuits 10 and 11, directly for the phase detector circuit 11 and through a phase shifting circuit 9 for the phase detector circuit 10. Thus, these two phase detectors receive reference signals shifted 90 degrees, against which they compare the output signals of the intermediate frequency amplifier 6.

The operation of the circuits 8, 9, 10, and 11 will best be understood through inspection of the equations of the various signals. If the transmitted high frequency signal is written in the form $\sin 2\pi f_0 t$ ($f_0$ designating the frequency of the high frequency signal), the received signal corresponding to a moving reflecting object having a radial velocity $v$ with respect to the antenna and located at a distance $R_0$ from the antenna is of the form:

$$\sin\left[2\pi(f_0 \pm f_d)t - \frac{4\pi f_0 R_0}{c}\right] = \sin\left[2\pi(f_0 \pm f_d)t - C\right]$$

where $f_d$ designates the Doppler frequency and $c$ designates the velocity of light. The signs + or − indicate a reflecting object having a radial velocity toward or away from the antenna, respectively. At the output of the intermediate frequency amplifier 6, the signal may be written as:

$$\sin[2\pi(f_m \pm f_d)t - C]$$

where $f_m$ designates the middle frequency of the intermediate frequency amplifier 6. Assuming that the coherent oscillator 8 supplies a signal $\sin 2\pi f_m t$, the signal at the output of the phase detector 11 may be written:

$$\sin(\pm 2\pi f_d t - C) \qquad (1)$$

Similarly, the signal which comes out of the phase detector 10 may be written:

$$\sin\left(\pm 2\pi f_d t - C\frac{\pi}{2}\right) = \cos(\pm 2\pi f_d t - C) \qquad (2)$$

since the reference signal supplied by the phase shifting circuit 9 is:

$$\sin\left(2\pi f_m t + \frac{\pi}{2}\right) = \cos 2\pi f_m t$$

The phase detector circuits 10 and 11 supply thus the two quadrature components of the signal at the Doppler frequency $f_d$. The knowledge of these two components makes it possible to determine the direction of displacement of the moving target, i.e. to detect whether the moving target producing this Doppler signal is an approaching or receding target.

In the continuation of the present description, the output signals from the phase detectors 11 and 10 will be called sin $a$ and cos $a$ respectively, for reasons of simplification and by analogy with the expression (1) and (2).

In the foregoing analysis, the repetition frequency F of the transmitted pulses has not been taken into account, for the sake of simplification in describing the development of the Doppler signals. When this repetition frequency F is taken into account, the signal obtained at the output of the phase detectors is more intricate and its frequency spectrum, in the case of a fixed reflecting object, is shown at FIG. 2. In this figure, as also in FIGURES 3 through 7, the frequencies $f$ have been indicated in abscissa and the amplitudes in ordinate. This spectrum is constituted by lines at the frequencies $nF$ enveloped, in the case of rectangular pulses, by the curve sin $\pi Fr/\pi Fr$, where $r$ designates the duration of the transmitted pulses.

FIGURE 3 shows, by using the same conventions, the spectrum of an echo from a moving object. It is constituted by lines at the frequencies $nF \pm f_d$, enveloped in the case of rectangular pulses by the curve:

$$\sin \pi Fr/\pi Fr$$

In fact, as it has been outlined previously, the frequency spectra obtained in a practical case at the output of the phase detector circuits 10 and 11 are much more intricate and are given by FIGURE 4, in the case of an echo from a fixed reflecting object, and by FIGURE 5, in the case of an echo from a moving object. In these FIGURES 4 and 5, only a few of the lines of the FIGURES 2 and 3 have been shown, and the width of the said lines, in fact the width of the envelopes of the lines $nF \pm fc$, has been taken equal to $2fc$, $fc$ being due in particular to circuit instabiliites and to the rotation of the antenna.

Figure 6:
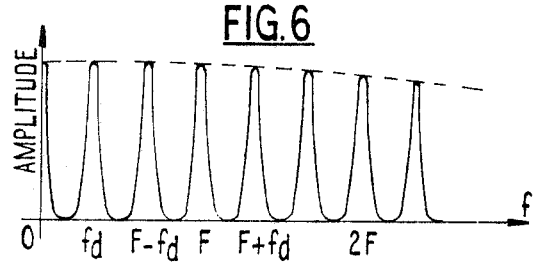
Figure 7:
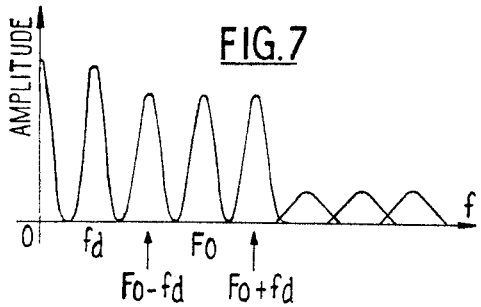
FIGS. 7, 12, 13, and 14 are frequency spectrum drawings relating to the operation of a coherent pulse-Doppler radar, the repetition frequency of which is not constant.

FIGURE 6 gives the frequency spectrum of signal corresponding to fixed objects superimposed on the spectrum from a moving object, this spectrum having been obtained by the superimposition of the spectra of FIGURES 4 and 5. FIGURE 6 will be seen to show that, when the Doppler frequency $f_d$ is close to the repetition frequency F of the transmitted pulses or to an integral multiple of this repetition frequency, it is impossible to detect it and it is said that under these circumstances "blind speeds" exist. FIGURE 6 shows also that two moving echoes corresponding one to a Doppler frequency $f_1 = f_d$ (value $f_d$ of FIGURE 6) and $f_2 = F - f_d$ for instance, the same frequency spectrum, i.e. the one given by FIGURE 6, and accordingly it is impossible to determine without ambiguity, the measurement of the Doppler frequency which thus exists.

Owing to the transmission of pulses at constant repetition frequency, as in the prior art, an ambiguity in the measurement of the range may also exist. The existence of such an ambiguity is explained by observing that objects located at the same bearing and separated by a distance equal to an integral multiple of the system range D [D designating the maximum range which has been selected by the choise of the repetition period $T(D=cT/2)$], may give rise to signals received at the same range within a subsequent repetition period. This ambiguity is particularly noticeable in high power systems and such ambiguous echoes are known as "second-time-around" echoes which come from objects having been illuminated by pulses from the penultimate transmitted pulse.

Figure 12:
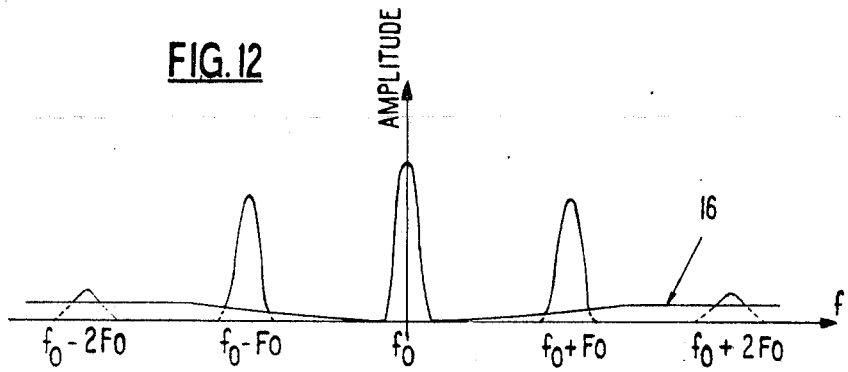

In order to clear up these two ambiguities of Doppler frequency and of range, the system of the present invention transmits pulses separated by unequal time intervals, the said time intervals varying on both sides of an average value which will be called pseudo-period $T_0$. It is then understood that such a process makes possible the elimination of such range ambiguity since objects at the same bearing but separated by a distance equal to an integer multiple of the maximum range $D = cT_0/2$ give rise to signals now received at different instances within each repetition period and may be eliminated by carrying out an integration of the signals received at the same time within several successive repetition periods. The manner in which this integration is achieved will be described further in this specification. In accordance with the present invention, it is possible to determine the frequency spectrum of such a series of pulses the period of which varies, in particular when this period varies around an average value $T_0$ in accordance with a Gaussian law of standard deviation $X_0$. The frequency spectrum of signals received from a fixed object is then given by FIGURE 12. Such a spectrum is constituted by a line or main apex in the neighborhood of the transmission frequency $f_0$, with secondary apexes having amplitudes smaller than the main apex and appearing at frequencies $f_0 \pm nF_0$, where $F_0 = 1/T_0$ designates the average repetition frequency. It has been demonstrated that the physical law defining this decrease of apexes assuming to the main apex of unity amplitude is given by the formula:

$$A_n = 1 - 20\left(\frac{nx_0}{T_0}\right)^2 \quad (3)$$

where $n$ designates the order of the apex (the main apex corresponds to $n=0$). It is also demonstrated that a continuous background exists which has the shape of the curve 16 and a level stabilized at the value $1/\sqrt{g}$, where $g$ designates the number of pulses transmitted for the radar during the time taken by the axis of the antenna to cross the point of three decibels beamwidth of the antenna radiation pattern.

Figure 13:
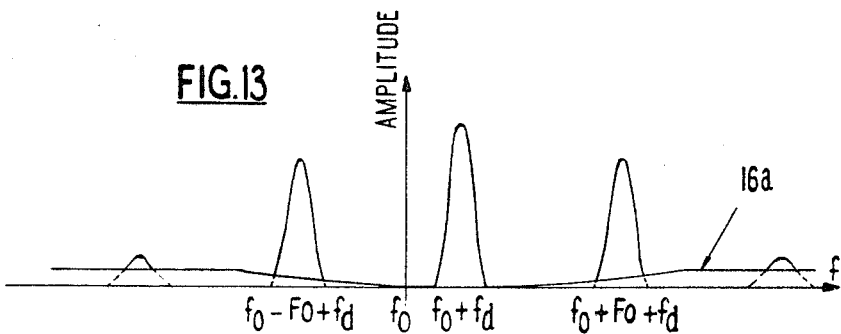
Figure 14:
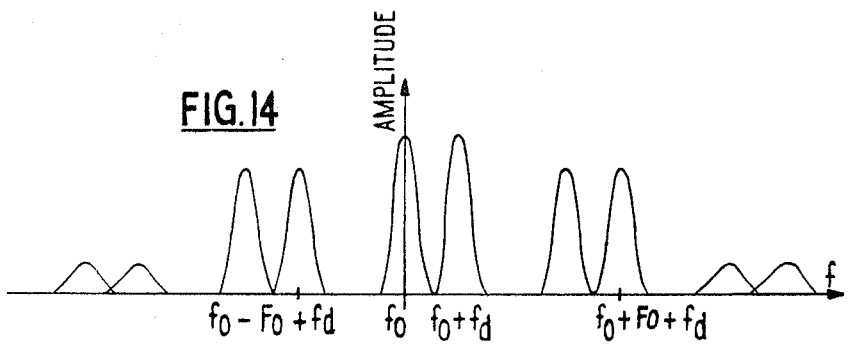

In the case of a moving reflecting object, the corresponding frequency spectrum of the received signals is given by FIGURE 13 and corresponds to the spectrum of a fixed object shifted by the value of the Doppler frequency $f_d$ of the said moving object. The continuous background level 16a corresponds to 16 mentioned in reference to FIGURE 12. When a fixed object and a moving object are superimposed, the frequency spectrum of the signals received is superimposition of the two spectra defined hereabove. FIGURE 14 gives the shape of such a combined spectrum. The continuous background is present but has not been represented in FIGURE 14. In order to obtain the spectrum of signals coming out of the phase detector circuits, it is sufficient to refold the spectrum of FIGURE 14 by using as a hinge the axis of frequency $f_0$; the spectrum of FIGURE 7 being thus obtained. It will be seen that an ampltiude discrimination facilitates the elimination of the ambiguity in the measurement of the Doppler frequency and correspondingly the elimination of blind speeds.

In the FIGURES 4, 5, 6, 7, 12, 13, and 14 the width of the lines has been much exaggerated with respect to the scale chosen on the abscissa; the width of these lines ranging on the order of hundreds of cycles per second, whereas the repetition period is generally several thousand cycles per second.

A particular example of instrumentation of a coherent pulse-Doppler radar which presents characteristics of the present invention will now be described with reference to FIGURE 8. In FIGURE 8, a few elements of FIGURE 1 have been represented and bear the same references, viz. the coherent oscillator 8, the phase shifting circuit 9 and the phase detector circuits 10 and 11. The circuit block referenced 14 represents the transmission and reception circuits of a coherent pulse-Dopper radar. However, whereas on FIGURE 1 assumption was made that the signals corresponding to the repetition frequency of the transmitted pulses were generated within the transmitter circuit 22, on FIGURE 8, these signals are in fact generated by the circuit 15 and are supplied as driver pulses to the circuit 14 for controlling the modulator of the transmitter. This circuit 15 is provided for supplying the required number of synchronizing signals and in particular for supplying to the modulator circuit of the transmitter a pattern of N trigger pulses in a series of randomly timed pulses the repetition period of which varies around an average value, this pattern being repeated continuously. It will be noted that the use of a repetitive pattern of N random pulses instead of a series of completely erratic pulses does not modify the frequency spectrum of the signal received from an obstacle provided that this number N is nearly equal to the number of pulses illuminating the said object during the crossing time of the antenna beam. If $T_0$ designates the average time of this variable repetition period, the time interval which separates two successive pulses of rank $K$ and $K+1$ will be given by $T_0+X_K$, where $X_K$ represents an erratic (random) variable, either positive or negative, the probability density of which is defined by a Gaussian curve of standard deviation $X_0$. The value of $X_0$ is determined by the Formula 3 according to the amplitude attenuation applicable to the first secondary apex of the spectrum of FIGURE 12. It will be observed that the time interval which separates the pulse of order N, i.e. the last pulse of the pattern, and the pulse of order $N+1$, i.e. the first pulse of the pattern, is given by $T_0+X_N$. It will be observed also that the average $T_0$ and the deviation $X_K$ must be chosen in such a way that the minimum time interval between two successive pulses should be equal to or higher than the time interval corresponding to the maximum range for which it is required to detect a reflecting object. Therefore, the deviations which are subtracted from the pseudo-period $T_0$ must not exceed a certain value which will be taken equal, in the particular example described, to the standard deviation $X_0$. Thus, in the example described, only objects inside a zone extending not more than thirty kilometers from the radar are involved, this corresponding to a minimum period equal to two hundred microseconds. Accordingly, a pseudo-period $T_0$ of two hundred and fifty microseconds must be selected when the standard deviation $X_0$ is fifty microseconds. It is noted that the restrictions imposed on the theoretical Gaussian law by using a repetitive pattern and by limiting the maximum negative deviation with respect to the pseudo-period $T_0$ have but little influence over the spectrum of the signal received from a reflecting object and therefore do not adversely affect the performance to be obtained.

The signals coming out of the phase detectors 10 and 11 which correspond respectively to the previously defined signals sin $a$ and cos $a$, are dealt with simultaneously in the same way in identical circuits. Thus, only the operation of the channel sin $a$ will be described in detail, but the reader will realize that the operation of the channel handling cos $a$ is identical. These circuits include circuits 17 through 22 for the sin $a$ channel and 23 through 28 correspondingly, for the cos $a$ channel. The signals sin $a$ from 11 are applied to sampling circuit 17 which cuts the signals into adjoining increments of equal duration $r$, each increment 17 corresponding to a zone of range located at a discrete range from the radar. In the example described, a duration $r$ of 3, 3 microseconds has been chosen, this corresponding to an increment of range of five hundred meters. This duration $r$ corresponds in fact to the duration of the pulses transmitted, said duration determining according to known criteria, the accuracy and the range discrimination of the radar. This sampling circuit receives this, from the clock circuit 15, signals of frequency $1/r=0.3$ megacycle per second resulting in samples of instantaneous signal amplitudes at that rate. The successive samples are coded afterwards in a coder 18 which generates a binary number of binary word with $p$ digits for each of the aforementioned amplitude samples. Each of these binary words characterizes the amplitudes of the corresponding sample. In the partciular example described, the number $p$ is equal to nine. The different signals required for the operation of the coder 18 are supplied by the clock circuit 15 and their frequency and duration is such as the coding is carried out in a time less than 3.3 microseconds. The intimate details of this particular coding operation are well-known in the digitl computer art. At the output of the coders 18 and 24, two binary words each with $p$ digits are available which correspond to one discrete zone located at a given range from the radar. These two words are written simultaneously in the memory 33 which, in the particular example described, is a ferrite core memory comprising $2p$ planes of $m$ lines and $q$ columns, the $p$ first planes being for instance assigned to the signal sin $a$ whereas the $p$ other planes are assigned to the signal cos $a$. The binary words corresponding to the signals received during a repetition period of the radar are wirtten successively within one line of the memory, the said line comprising a sufficient number of cores to enable the writing of all the signals corresponding to objects located in a predetermined range one of interest. If this zone is, for example, thirty kilometers, the minimum number or cores to be provided per line will be equal to the number of five hundred meters increments (3.3 microseconds zones) contained in thirty kilometers, viz. sixty cores.

The signals received during the following repetition period are written in the following repetition periods until $m$ lines are filled. It is thus seen that the binary words corresponding to a zone at a given range zone from the radar are written at the same line location, i.e. the binary words of one column of the memory 33 give the history in course of time of that done of range throughout a number of repetition periods. On the other hand, since the time intervals which separate the transmitted pulses are not equal but vary and the writing of the lines of the memory 33 begins always at the same instant of a period, viz. at the beginning of the said period, the signals written in the succesive lines of a column are separated during writing by unequal time intervals so that the signals receive from objects located at the same bearing and separated by an integral multiple of the maximum range $D=cT_0/2$ of the radar ("second-time-around" echoes) are written in different columns. In this way they give rise to spurious (parasitic noise) signals. However, the signals of a particular column no longer include signals which, in the case of transmitted pulses at constant repetition frequency, would create a range ambiguity. The ambiguity in the measurement of the range will thus be seen to have been eliminated. The minimum number of memory lines to be provided will be discussed further on. It will be noted that the signals received two hundred microseconds or more after the transmission of each pulse and before the transmission of the following pulse are not written in the memory 33.

Figure 11:
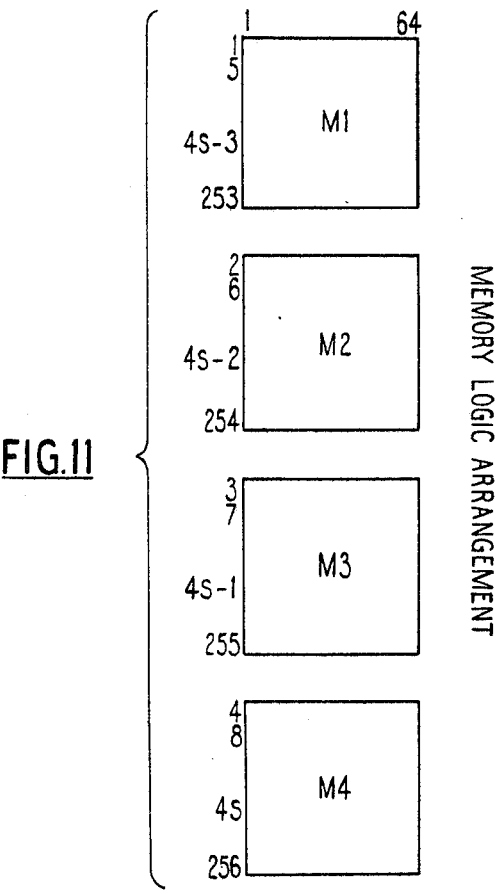
FIG. 11 details the logical organization of the memory bank of the present invention.

As it will be seen further on, in relation with FIGURE 11, the memory 33 and its writing and reading circuits are designed in such a way that in the course of a repetition period the writing of one line and the reading of one column are carried out contemporaneously. The writing of the following line and the reading of the following column are then carried out in the course of the following repetition period. The operations of writing and reading are controlled by the circuit 34 which receives from the clock circuit 15 the synchronizing signals required for its operation.

The number $m$ of lines that the memory 33 must include is determined by the number of signals which must be received from an object in order to preserve the dynamic range of the radar. Thus, if this dynamic range is of the order of forty decibels, the signals must be written up to a level which provides signals not more than forty decibels below maximum signal, i.e. the signals must be written during a time equal to the crossing-time of the antenna beam from beam center to the angle where beam energy is down twenty decibels. If it is assumed that the antenna beam has the shape of a Gaussian curve the 3 db width of which is known, the time interval which separates two crosses at twenty decibels is equal to 2.58 times the crossing-time at three decibels. This crossing-time at three decibels is obviously a function of the 3 db antenna beam width and to the angular rotation speed of the antenna. In the example described, one obtains a time of passage between twenty decibel points of fifty-seven milliseconds if the antenna beam width at three decibels is 4 degrees and the rotation speed is one-half revolution per second. Knowing that the average repetition period is $T_0=250$ microseconds, it is seen that the minimum number of signals to be received from one discrete object is two hundred and twenty-eight and therefore two hundred and twenty-eight lines are necessary. However, in order to use standardized binary digital memory elements, $m=256$ lines was chosen and $q=64$ columns was included instead of sixty.

It will be observed that the aforementioned number of two hundred and twenty-eight is also the maximum number of pulses which would be necessary in a pattern. In fact, the number N of pulses of the pattern is substantially lower than two hundred and twenty-eight, and experiments have shown that a value of N as low as 16 and even lower can be accepted without substantially altering the frequency spectrum of the received signals.

Owing to the duration of one reading operation of a particular ferrite core, the two hundred and fifty-six words of one column cannot be read successively in a time equal to an average repetition period $T_0$ and it is therefore necessary to organize the memory 33 in the manner which will be described in relation with FIGURE 11. Furthermore, owing to the fact that during a repetition period two hundred and fifty-six words are read with destructive readout whereas only sixty words are written, it is necessary to make provision for reading with a rewriting of part of the read words. Digressing now to a discussion of FIGURE 11, the memory 33 will be seen to be split into four blocks M1, M2, M3 and M4 (FIGURE 11), each one comprising eighteen planes of sixty-four columns and sixty-four lines, with each one of these blocks including its own writing and reading circuits, so that it is possible to carry out simultaneously operations in the four blocks. The successive lines of the memory 33 numbered from 1 to 256 are distributed in interlaced fashion in the different blocks in such a way that the line 2 constitutes the first line of the block M2, the line 3 constitutes the first line of the block M3, and the line 4 constitutes the first line of the block M4. To generalize, the line $4s-3$ constitutes the $s^{th}$ line of the block M1, the line $4s-2$ constitutes the $s^{th}$ line of the block M2, the line $4s-1$ constitutes the $s^{th}$ line of the block M3, and the line $4s$ constitutes the $s^{th}$ line of the block M4. This distribution is illustrated by FIGURE 11; the columns having been numbered from 1 to 64. The operations to be carried out during a repetition period are the following:

(a) writing of sixty-four words on one line
(b) reading of two hundred and fifty-six words on one column
(c) rewriting of one hundred and ninety-two words.

The operations in the memory 33 take place then in the following way duirng four successive repetition periods:

During the first repetition period: writing of the line $4s-3$ of the block M1 and reading of the column $4s-3$ (modulo 64). By $4s-3$ (modulo 64), one understands in a classical way the remainder of the division by sixty-four of the number $4s-3$ by limiting the division up to obtain an integer quotient. During each time slot $r=3.3$ microseconds, a word is written in the line $4s-3$ of the block M1 and the simultaneous reading of four digits of the column $4s-3$ (modulo 64) is carried out at the rate of one digit per block. This reading starts at the digits located at the cross-points of the column $4s-3$ (modulo 64) and of the lines $4s-2$ of the block M2, $4s-1$ of the block M3 and $4s$ of the block M4. The sixty-four first read words, viz. sixteen digits per block are not rewritten whereas the one hundred and ninety-two other words are read, then rewritten. However, since it is not possible to carry out more than two operations in one block during a time slot $r=3.3$ microseconds. The forty-eight words of the block M1, in which inputs are written according to the line $4s-3$, cannot be rewritten during the repetition period in course and are instead kept in memory in a register in order to be rewritten by group of sixteen words at a time during the course of the three following repetition periods, during the sixteen times assigned to the reading of the abovementioned digits which are not rewritten.

During the second repetition period: writing of the line $4s-2$ of the block M2 and reading of the column $4s-2$ (modulo 64). The operations carried out are the same as those described under the above paragraph relating to the first repetition period but with permutation between the blocks M1 and M2.

During the third repetition period: writing of the line $4s-1$ of the block M3 and reading of the column $4s-1$ (modulo 64). With respect to the second repetition period, a permutation takes place between the blocks M2 and M3.

During the fourth repetition period: writing of the line $4s$ of the block M4 and reading of the column $4s$ (modulo 64). With respect to the preceding repetition period, a permutation takes place between the blocks M3 and M4.

During the fifth repetition period, the writing of the line $4(s+1)-3$ located in the block M1 and the reading of the column $4(s+1)-3$ (modulo 64) are carried out.

In the same way as the block M1, the blocks M2, M3 and M4 comprise a register which can record forty-eight words of eighteen digits. The different operations to be carried out in the memory 33 are controlled by the circuit 34 which can be implemented according to known digital computer techniques. This way of operation is similar to that described in H. J. Bosc-J. M. H. Colin-J. M. Villenagne-R. Viscocekas, Ser. No. 530,764, filed Feb. 17, 1966, entitled, "Memory for a Coherent Pulse Doppler Radar." In the above-mentioned case, the memory is split in two blocks, one reserved to the lines of odd rank and the other one reversed to the lines of even rank, but that device may be easily extended to a number of blocks bigger than two.

The binary words of one column, which are read during a repetition period, are applied to a decoder circuit 19 for the signal sin $a$ to a decoder circuit 26, identical to the circuit 19, for the signal cos $a$. As it has been described previously, each basic time (range) increment $r=3.3$ microseconds, four words of eighteen digits are read simultaneously in the memory 33, but these four words correspond to four successive repetition periods, so that they must be converted into analog signals in the chronological order of these four periods. The decoder circuits 19 and 25 must thus each include a register which is capable of recording four words of nine digits, and means must be provided for decoding successively the four words. The output signals of the decoder circuit 19 are applied to a circuit 20 where they are multiplied or weighted by a factor which is small at the beginning and at the end of reading of one column, and maximum at the middle. The purpose of this weighting is to avoid excitation effects by ringing the Doppler filters to which these signals are to be applied. In effect, the first word read in a column corresponds to an ambiguity point in the crossing of the antenna beam over a reflecting object, and it may happen that the resulting signal is strong at the moment of starting the reading, such a signal exciting then all the Doppler filters. It is demonstrated that the weighting function which affords the least possible spurious enlargement of the spectrum of the signal while collecting the maximum energy, is the Gaussian function. Accordingly, the different values of the weighting factor are determined by a Gaussian curve; these different values (the number of which is $m/2$, since the Gaussian curve is symmetrical) are recorded in a circuit 37 (FIGURE 8) and chosen sequentially by synchronizing signals delivered by the circuit 34. In the example described, these signals must have a repetition period such that four signals appear during a time separating two successive readings, viz. a repetition period of $3.3/4=0.83$ microsecond. These signals are then also used for decoding control in the circuits 19 and 25.

The output signals of the weighting circuit are applied to an MTI filter 21, the bandpass of which is included between a lower cut-off frequency $kfc$ and a higher cut-off frequency $kF/2$. The multiplying factor $k$ arises from the fact that all the signals of one column are written in a time equal to $mT_0$, whereas the reading of one column is carried out during a time $u$ equal to or lower than $T_0$. This process carries out a time compression corresponding to a multiplication of the frequencies by a factor $k=mT_0/u$. In the example described, the factor $k=300$.

The signals coming out of the filter 21 no longer include the components of the fixed echoes, but if a moving echo exists, one of the spectrum lines $nF \pm f_d$ and only one, will be transmitted by the filter. It will be observed that the filter would transmit all the parts of the spectrum of signals located within its bandpass, however, as it has been seen previously, the rank $n$ of the line $nF \pm f_d$ and only one, will be transmitted by the filter. It will be observed that the filter would transmit all the parts of the spectrum of signals located within its bandpass, however, as it has been seen previously, the rank $n$ of the line $nF \pm f_d$ which is the bandwidth of the MTI filter is not determinable, and therefore, the actual Doppler frequency $f_d$ cannot be known. In order to obviate this ambiguity and recognize Doppler frequency $f_d$ the spectrum of the output signal of the phase detector circuit 11 corresponding to a moving object is recreated, the said spectrum no longer including the components due to the fixed objects, since these have been eliminated by the MTI filter. The filtered signal outputs from MTI filters 21 and 27 are sampled in circuits 22 and 28 respectively, by pulses which reproduce at the accelerated time scale, the instantaneous values of the signals. When these new samples are shifted in time in such a way as to replace them, in real time at the instants of time they occupied with respect to transmitted pulses at the time of their coding and recording, still nevertheless maintaining the accelerated time scale.

Figure 9:
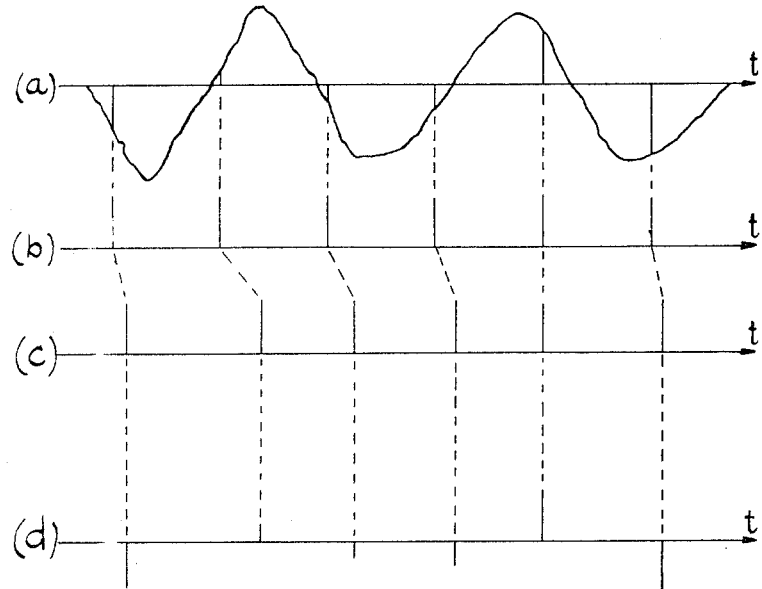
FIGS. 9a, b, c, and d are signal timing diagrams descriptive of a sampling operation performed in the configuration of FIG. 8.

The FIGURES 9a, 9b, 9c and 9d illustrate these two operations. The FIGURE 9a represents the output signal to the filter 21 in relation with the time $t$. This signal is sampled in circuit 22 by the recurrent pulses from 15 illustrated in FIGURE 9b. The said pulses have the same repetition period as the pulses used for the weighting in circuit 20 which were supplied to the circuit 37 by 15 through 34, viz. a period of 0.83 microsecond. FIGURE 9c represents the pulses which reproduce the transmission sequence at the aforementioned accelerated rate. It will be noted that provision must be made for a synchronization between the rank of the line in the read column and the rank of the pulse of the transmitted pattern which has given rise to the recording of the said line. This synchronization may be facilitated by choosing a number $m$ of lines which is an integral multiple of the number N of pulses of the pattern. FIGURE 9d gives the signal resulting from this sampling of 9a by 9c pulses. The pulses which reproduce the said FIGURE 9d pulse pattern are originally generated by the clock circuit 15 in a way similar to that for generating the transmission pulses, except that the frequency is three hundred times higher than that of the transmission pulses.

The reader is again reminded that the different operations carried out on the signal $\sin a$ are also carried out simultaneously and in synchronism on the signal $\cos a$ through identical circuits. In this way, the signals $\sin a$ and $\cos a$ corresponding to the same discrete range increments are applied to a battery of parallel input Doppler filters 29 (FIGURE 8) which cover the whole range of Doppler frequencies which it is desired to detect. The separation of Doppler velocities, of course, permits isolation of corresponding reflecting object radial velocity magnitudes.

Figure 10:
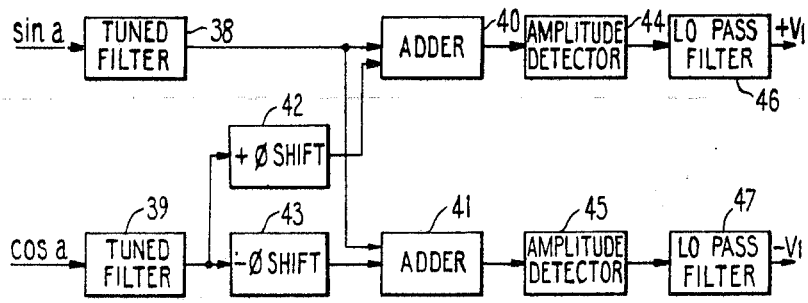
FIG. 10 details a typical one of the individual Doppler filter channels according to the present invention.

FIGURE 10 illustrates the detailed implementation of one of the Doppler channels. Each Doppler channel within block 29 of FIGURE 8 corresponds to an absolute value of radial velocity. The signals $\sin a$ and $\cos a$ are applied to two identical narrow bandpass filters 38 and 39, tuned to pass a Doppler frequency $f_1$ corresponding to a radial velocity $v_1$ of an approaching or receding target. These filters are called Doppler filters. In order to know the sense (direction) of this radial velocity, several devices may be used and one of them consists, as shown on FIGURE 10, applying the output signal $\sin a$ of the filter 38 to two identical adding circuits 40 and 41 which receive also the filtered signal $\cos a$ which is phase-shifted by $+90$ degrees in a circuit 42 for the adding circuit 40, and phase-shifted by $-90$ degrees in a circuit 43 for the adding circuit 41. According to the sign of the velocity $v_1$, the signals will be in phase in one of the adding circuits, and in phase opposition in the other, making it possible to determine this sign by inspection of amplitude of the output signals of these two adding circuits 40 and 41. In FIGURE 10, it has been assumed that when the two filtered signals were in phase after a phase-shifting of $+90$ degrees of the signal $\cos a$, this corresponded to a velocity $+v_1$ of an approaching target; or on the other hand, when the two signals were in phase after a phase-shifting of $-90$ degrees of the signal $\cos a$, this corresponded to a velocity $-v_1$ of a receding taget. The output signals of the adding circuits 40 and 41 are applied respectively to two amplitude detecting circuits 44 and 45 followed by low-pass filters 46 and 47.

The number $h$ of Doppler channels, and thus the number $2h$ of Doppler filters that a battery of Doppler filters 29 must include, results from a compromise between the number of filters which would have been necessary in order to have a maximum sensitivity, and the minimum number of filters determined by the radial velocity discrimination desired. The battery of Doppler filters 29 presents $2h$ outputs which are applied to a threshold circuit 30. This circuit 30 is constructed as a "base clipper" and operates in such a way that only the output of the Doppler filters 29 which exceeds a predetermined threshold results in a signal at its output. Besides, since the number $h$ of Doppler channels is usually higher than the minimum number required for obtaining a certain radial velocity dicrimination, this circuit 30 may be used also for effecting grouping of the data corresponding to a range of radial velocities equal to the discrimination in radial velocity. Thus, in the example described wherein only objects having radial velocities ranging between fifty meters per second and one thousand meters per second (with discrimination in radial velocity of fifty meters per second) are involved, the minimum number of Doppler channels would be equal to nineteen, viz. a number of sub-ranges equal to thirty-eight (positive and negative velocities). The number $h$ of Doppler channels actually used for obtaining a sensitivity close to the optimum, is equal to seventy-six, viz. one hundred and fifty-two sub-ranges, each one corresponding to twelve and a half meters per second. Accordingly, this leads to grouping of the adjacent sub-ranges of same sign, four by four, in order to obtain the desired discrimination in radial velocity of fifty meters per second. The threshold circuit 30 comprises thus thirty-eight outputs numbered from 1 to 38, each one corresponding to a sub-range of fifty meters per second; only one of these thirty-eight outputs presenting a signal at a given instant of the repetition period. Provision is also made for two additional outputs, one referenced PE presenting a signal called a "presence-echo" signal when the signal of a channel exceeds the threshold, and the other one referenced AMP proportional to the amplitude of the echo signal.

The circuit 31 to which are applied the forty outputs of the circuit 30 is provided for coding the position of the sub-range within the range under the form of a parallel binary code with six digits (output 48), five digits being used for the magnitude of the velocity and one digit for the sign of this velocity. This circuit 31 is also used for coding the maximum amplitude of the echo signal according to a four-digits code (output 49), for instance, as well as for passing on the digit 1 or 0 (output 50) corresponding to the presence or the absence of the echo signal. These codes are written in a register 32 in which are also written the six digits code of the examined range increment, i.e. the code of the read column which is supplied from the circuit 34 and the code of the bearing corresponding to the maximum of the amplitude of the echo signal. At each repetition period, the register 32 thus contains, in a coded form, all the data which can be extracted from the examined range increment; these data may be directly used by a computer for air traffic control or other purposes beyond the scope of this invention.

The circuits which make possible the determination of the exact bearing of the object which gave rise to an echo signal, have been shown very schematically on FIGURE 8. These circuits comprise mainly a memory 36 provided for recording $m$ successive codes corresponding to $m$ successive coded angular positions of the scanning antenna, each position being reassessed during each repetition period. The $m$ lines which are included in the memory 36 correspond to the $m$ lines of the memory 33 and the recording operations in this memory 36 controlled by 15 and 34 and are carried out in synchronism with those of the memory 33, so that to a line M corresponds a similar line of same rank in 36. The time position of the maximum of the echo signal with respect to the instant of the beginning of the reading of a column is determined by a circuit 35, which determines the line of the memory M in which this maximum signal has been written, and therefore determines the line of the memory 36 which must be read (with rewriting) in order to determine the bearing at which the said maximum signal has been received.

It will be observed that the instant of occurrence of the maximum of the echo signal does not directly give the position of the maximum of the signal read on one column, since a shifting of the maximum of the signal of a column exists usually as a result of the weighting carried out. This shifting taking place when the maximum of the signal read on one column and the maximum of the weighting curve do not coincide. Means for correcting this displacement are not described in detail but will suggest themselves to the skilled reader.

It is easily realized that this auxiliary memory 36 may be in fact included within the structure of the memory 33 since the writing operations in the two memories are carried out in synchronism.

The circuit described, in relation with FIGURE 8, uses an MTI filter, i.e. a filter eliminating the components close to the frequency zero, however, it will be realized that this filter may be replaced by another filter eliminating components at other frequencies such as the Doppler frequencies corresponding to the moving speed of the radar, as for example when the radar itself is on a moving vehicle.

Implementation of the present invention relies heavily on digital computer circuit and logical organization techniques, which will be recognized by the reader skilled in these arts.

While the principles of the above invention have been described in connection with specific embodiments and particular modifications thereof, it is to be clearly understood that this description is made by way of example and not as a limitation of the scope of the invention. The drawings and description are to be regarded as illustrative only.

What is claimed is:

1. A coherent pulse-Doppler radar system comprising: transmitter means for generating and radiating a pattern of pulses of electromagnetic energy; receiving means for receiving echoes from objects illuminated by said pulses; means associated with said transmitter means including a coherent oscillator, for retaining a memory of the phase of transmitted pulse energy for a predetermined time following each transmitted pulse and expiring before the next following transmitted pulse; means for comparing the phase of energy in said received echoes with said retained transmitted pulse energy phase to produce a phase difference signal having sine and cosine signal components; pulse control means for generating synchronizing pulses to initiate generation of said pulses from said transmitter means; said pulse control means being adapted to vary the repetition frequency of and therefore the repetition period between successive ones of said transmitted pulses according to a predetermined repetitive function; sampling and encoding means responsive to said sine and cosine components for producing a number of digital code words during each of said repetition periods, the instantaneous amplitude of said sine and cosine signal components each being described by a separate code word in each of a plurality of predetermined range increments; a digital memory bank for recording said code words over a plurality of repetition periods; means for reading the stored code words separately for said sine and cosine components within each of said range increments over a plurality of repetition periods, and for restoring said signals to analog form; means operative to multiply each of said sine and cosine components by a weighting function representative of the scanning beam shape of the radar system; and first filtering means responsive to said weighted sine and cosine signal components for eliminating frequency components therefrom corresponding to fixed echo signals.

2. The invention set forth in claim 1, further defined in that said predetermined repetitive random function is substantially a Gaussian function.

3. The invention set forth in claim 1 further defined in that there are included additional filter means responsive to said signals from said first filter and weighting circuits, said additional filter means adapted to extract separately a plurality of output signals each limited to a discrete narrow band of frequencies corresponding to a particular Doppler (velocity) signal.

4. The invention set forth in claim 3 including direction detection means which comprises circuits for evaluating sense of rotation of the phase vectors corresponding to the rector sums of the sine and cosine components of the said Doppler signals, thereby making possible the association of the senses of said phase rector rotation one with approaching reflecting objects and the other with retreating reflecting objects.

5. The invention set forth in claim 3, further defined in that there are provided additional means comprising: velocity encoding means responsive to the outputs of said additional filter to encode the said Doppler signals as a function of frequency and therefore of velocity of the corresponding reflecting object; means responsive to the instantaneous position of the scanning antenna of said radar system to generate, for each repetition period, a digital code word representative of the bearing of said antenna during said repetition period; and a storage register responsive at least to the outputs of said velocity encoding means, to said bearing representative of one of said range increments corresponding to a given signal, thereby to store at least coded velocity, bearing and range data, 6. The invention set forth in claim 1 including means responsive to the variation in timing of transmission of each of said transmitted pulses with respect to a predetermined specific timing, and for controlling the delay applied to echo signals received in response to each transmitted pulse, thereby to preserve the time versus range relationships within the said radar system.

References Cited

UNITED STATES PATENTS

| | | | |
|---|---|---|---|
| 3,066,289 | 11/1962 | Elbinger | 343—7.7 |
| 3,169,243 | 2/1965 | Kuhrdt | 343—7.7 |
| 3,230,526 | 1/1966 | Tanfer et al. | 343—7.7 |

RODNEY D. BENNETT, JR., *Primary Examiner.*

CHARLES L. WHITHAM, *Assistant Examiner.*

U.S. Cl. X.R.

343—9